(No Model.)  2 Sheets—Sheet 1.

J. M. MILLER.
LAND ROLLER.

No. 586,909.  Patented July 20, 1897.

Witnesses
H. G. Dieterich
V. B. Hillyard

Inventor
James M. Miller
By his Attorneys,
C. A. Snow & Co.

(No Model.) 2 Sheets—Sheet 2.
J. M. MILLER.
LAND ROLLER.
No. 586,909. Patented July 20, 1897.
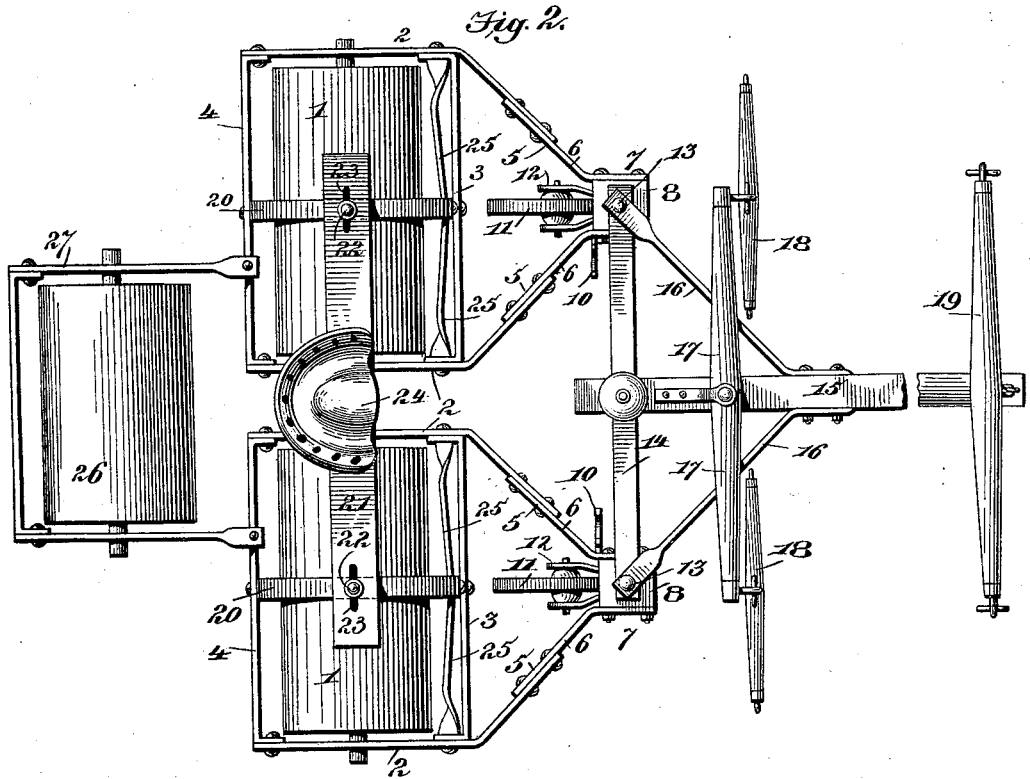
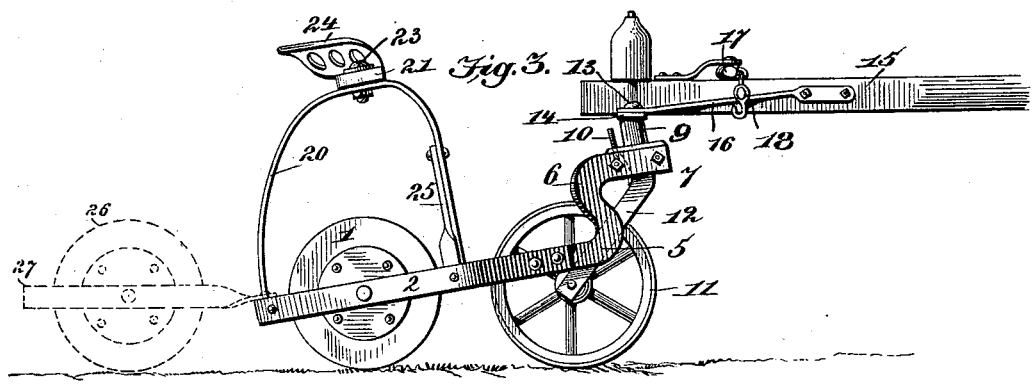
Witnesses
H. T. Dieterich
V. B. Hillyard
Inventor
James M. Miller,
By his Attorneys,
C. A. Snow & Co.

UNITED STATES PATENT OFFICE.

JAMES M. MILLER, OF RICHLAND, INDIANA.

LAND-ROLLER.

SPECIFICATION forming part of Letters Patent No. 586,909, dated July 20, 1897.

Application filed July 14, 1896. Serial No. 599,143. (No model.)

*To all whom it may concern:*

Be it known that I, JAMES M. MILLER, a citizen of the United States, residing at Richland, in the county of Rush and State of Indiana, have invented a new and useful Land-Roller, of which the following is a specification.

This invention relates to that class of agricultural implements designed for leveling and pulverizing the soil subsequent to plowing and harrowing and prior to planting, thereby preparing the ground for the reception of the seed, and which can be used for rolling the land after the plants are up, so as to crush out weeds and objectionable growths, the implement being especially designed to steer clear of the plants, so as to avoid injury thereto when advancing over the field.

The principal object of the invention is to construct a land-roller which will be under the control of the driver at all times, the driver riding, thereby adding weight to the implement and lessening the task, and the rollers being guided by the feet of the driver and caused to follow any irregularities in the rows, thereby leaving the hands free to drive the team and attend to other matters requiring attention.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1:
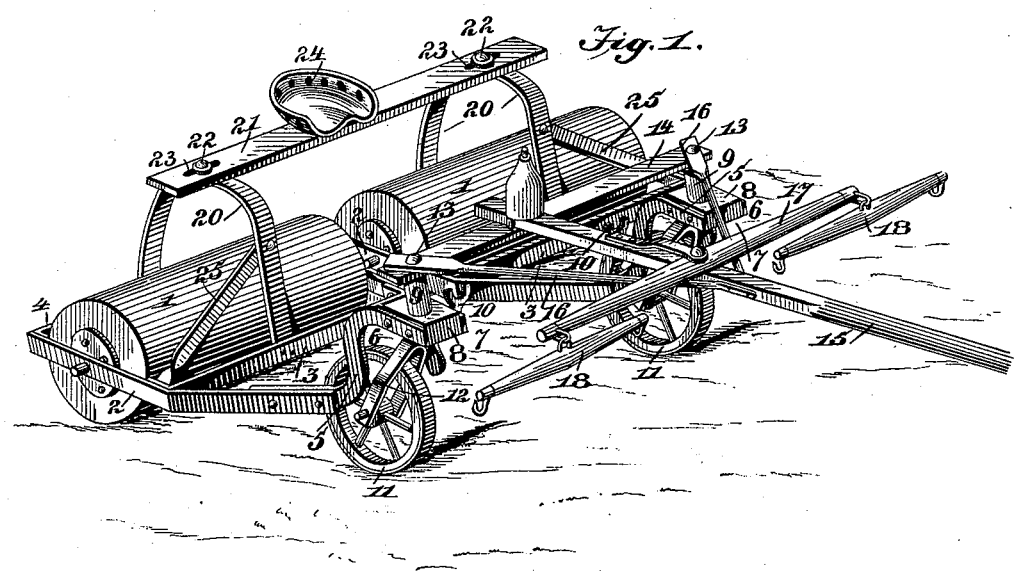
Figure 4:
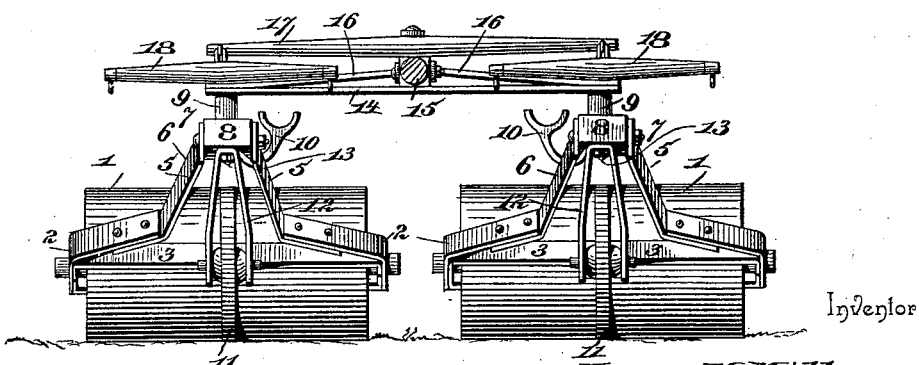

Figure 1 is a perspective view of a landroller for effecting the ends of this invention. Fig. 2 is a top plan view thereof, showing a third roller applied. Fig. 3 is a side elevation, the dotted lines showing the third roller. Fig. 4 is a front view.

Corresponding and like parts are referred to in the following description and indicated in the several views of the accompanying drawings by the same reference-characters.

The implement comprises two rollers 1 of like dimensions and arranged in transverse alinement, and frames of similar construction, one for each roller, and as the frames are duplicates, or practically so, a detailed description of one will be sufficient. Each frame is right-angular in outline and comprises side bars 2, a front bar 3, and a rear bar 4. The side bars 2 are apertured to receive the journals or ends of the shaft upon which a roller is mounted. A draft-frame is secured to the roller-frame and comprises draft-bars 5, which are secured at their rear ends to the roller-frame in any convenient way, preferably by being riveted or bolted to extensions of the bars 2. The front ends of the draft-bars curve upwardly, as shown at 6, thence forwardly, as indicated at 7, and receive between their front ends a block 8, from which rises a bearing-sleeve 9. A foot-rest 10 is applied to the front end of the draft-frame adjacent to the bearing-sleeve 9, and receives the thrust of the driver's foot to properly guide the rollers when the implement is drawn over the field.

Each roller-frame has a pilot-wheel 11, which is journaled to the members of a forked frame 12, the latter inclining rearwardly at its lower end and having connection with the draft-frame by a king-bolt or stem 13, which latter passes through the bearing-sleeve 9. A bar 14, extending transversely of the implement, unites the upper ends of the king-bolts or stems 13 and serves to connect the draft-frames and the roller-frames. The pole or tongue 15 is attached to the bar 14, and is strengthened by braces 16, which have connection at their rear ends with the end portions of the bar 14, and this pole is supplied with the usual doubletree 17, singletrees 18, and neck-yoke 19.

Each roller-frame has an arched bar 20, which spans the roller and is connected at its extremities with the front and rear bars 3 and 4, and a plate 21 has adjustable connection near its ends with the upper portions of the arched bars 20 by means of bolts 22, operating in slots 23 of the plate 21. The seat 24 is attached to the plate 21 and comes directly in the rear of the pole 15 and over the space formed between the inner ends of the rollers 1. Braces 25 connect the front members of the arched bars 20 with the outer side bars of the roller-frames and serve to hold the arched bars in proper position.

The roller-frames are united by the plate 21 and the bar 14 and are steered by the driver perched upon the seat 24 by exerting pressure upon the foot-rests 10 through the intervention of his feet, thereby leaving the hands free to handle the reins or for any purpose requiring special attention.

When the implement is especially designed for preparing the ground for seeding, a third roller 26 is located in the rear of the rollers 1 and directly opposite the space formed between the said rollers, so as to act upon the ground not pulverized by reason of the space formed between the rollers 1. This roller 26 is journaled in a frame 27, which is secured to the rear bars of the main roller-frames in such a manner as to admit of its being readily disconnected or applied thereto.

Having thus described the invention, what is claimed as new is—

1. In a land-roller, the combination of a pair of independent similarly-formed roller-frames placed in transverse alinement, each provided with a draft-frame having its front end curving upwardly and forwardly, a forked frame journaled vertically to the front end of each draft-frame and bearing a pilot-wheel, a bar having direct attachment with the vertical journals of the forked frames and connecting the draft-frames, and means for applying the draft to the said bar, substantially as set forth.

2. In a land-roller, the combination of two independent roller-frames, draft-frames applied to the roller-frames and having their front ends curving upwardly and forwardly, forked frames journaled to the front ends of each of the draft-frames and bearing pilot-wheels, a bar uniting the vertical journals of the forked frames, a pole or tongue having connection with the said bar intermediate of its ends, and braces between the pole and the said bar, substantially as and for the purpose set forth.

3. The herein-described land-roller, comprising independent roller-frames having the rollers journaled thereto, draft-frames having connection with the roller-frames and having their front ends curving upwardly and forwardly, and having a foot-rest and a bearing-sleeve, forked frames journaled in the bearing-sleeves of the draft-frames and bearing pilot-wheels, a bar uniting the vertical journals of the forked frames and adapted to have the draft applied thereto, arched bars spanning the rollers and having their ends connected with the front and rear bars of the roller-frames, and a plate bearing a seat and having adjustable connection with the upper ends of the arched bars, substantially as set forth.

In testimony that I claim the foregoing as my own I have hereto affixed my signature in the presence of two witnesses.

JAMES M. MILLER.

Witnesses:
GEORGE W. OSBORNE,
JOHN A. TITSWORTH.